Sept. 29, 1953  H. W. OVERMAN ET AL  2,653,644
APPARATUS FOR BONDING LININGS TO BRAKE SHOES
Filed June 14, 1949  3 Sheets-Sheet 1

INVENTOR.
Horace William Overman
BY Charles G. Wolgamott
Warren W.F. Schmieder
ATTORNEY Sept. 29, 1953 H. W. OVERMAN ET AL 2,653,644
APPARATUS FOR BONDING LININGS TO BRAKE SHOES
Filed June 14, 1949 3 Sheets-Sheet 2

INVENTOR.
Horace William Overman
BY Charles G. Wolgamott
ATTORNEY

Sept. 29, 1953   H. W. OVERMAN ET AL   2,653,644
APPARATUS FOR BONDING LININGS TO BRAKE SHOES
Filed June 14, 1949   3 Sheets-Sheet 3

INVENTOR.
Horace William Overman and
BY Charles S. Wolgamott
Warren W. Schmieding
ATTORNEY Patented Sept. 29, 1953

2,653,644

UNITED STATES PATENT OFFICE 2,653,644

APPARATUS FOR BONDING LININGS TO BRAKE SHOES

Horace William Overman and Charles G. Wolgamott, Columbus, Ohio, assignors, by mesne assignments, to Bigelow, Inc., a corporation of Ohio Application June 14, 1949, Serial No. 98,988

8 Claims. (Cl. 154—1)

1

The invention relates to machines for lining brake shoes, and more particularly to a machine for bonding a brake liner on a brake shoe. In general, the machine includes a platen or anvil for supporting the assembled brake shoe and liner, a burner for heating the platen where heat is to be used in the bonding process, and means for applying and maintaining pressure over the surface between the brake shoe and liner during the bonding operation.

It is an object of the invention to provide a machine of the character stated, which is adapted to bond brake liners to shoes by either a hot or cold process, and which follows through with the application of pressure when the bonding agent flows so that a constant pressure is maintained throughout the entire operation.

One of the objects of this invention is to provide a platen having a slotted surface adapted to support an assembled brake shoe and liner in a position to be heated and to have an equal pressure maintained over the surface between the shoe and liner while heat is being applied. With this construction the temperature applied to the surface between the shoe and the liner is maintained in a minimum range of about 325° F. which is high enough to provide for the bonding action to be completed within a period of approximately 8 to 10 seconds, but which temperature and time range remains below the curing temperature range of the liner. The entire bonding operation is completed with a minimum of time and at temperatures which do not adversely affect the liner composition.

Another object of the invention is to provide an element for applying and maintaining an equal pressure over the surface between the platen, shoe and liner during the bonding operation. This element includes flexible straps arched over the platen and adapted to engage the liner and apply pressure in a line contact first at a position intermediate the ends of the liner and then progressively over the surface between the liner and the shoe. The straps are pivotally connected so that they adjust to the surface of the liner and provide for equal distribution of the applied pressure over the entire surface between the shoe and liner. With this construction no blisters or bubbles are formed between the shoe and liner from gas released during the bonding operation since there is no variation in the pressure maintained on the liner at any point.

It is also an object to provide the flexible strap of the element for applying pressure to the liner

2 with pivotal mountings so that the straps move freely and adjust to compensate for any variation or uneven surface on the liner. The pressure applying element includes a singletree construction which provides for applying the pressure tangent to the arc of the shoe at the ends of the arc. A maximum pressure is thus applied and maintained equally distributed over the entire surface between the shoe and liner. Means are also provided for spreading the ends of the straps to facilitate their removal from the liner when the bonding operation is completed.

It is another object to provide a movable carrier for supporting the pressure applying element over the platen. This construction provides for moving the arched straps away from the platen and facilitates placing assembled shoes and liners on the heated platen and their removal when the bonding operation is completed.

An additional object is to provide a retaining means for positioning a liner on a brake shoe which comprises a spring connecting a pair of hooks. The hooks are spread at the ends and serve as locaters for centering the shoe and liner assembly on the platen. This construction provides for assembling and positioning the brake shoe and liner on the platen with a minimum of time and skill and for the rapid operation of the machine.

Further objects and advantages of the present invention will be apparent from the following description, reference being had to the accompanying drawings wherein a preferred form of embodiment of the invention is clearly shown.

Figure 6:
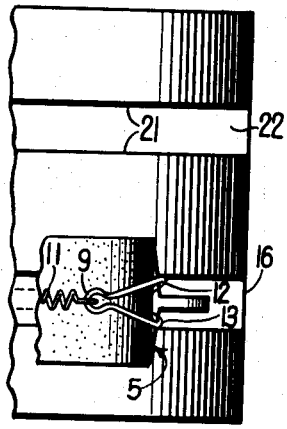
Figure 4:
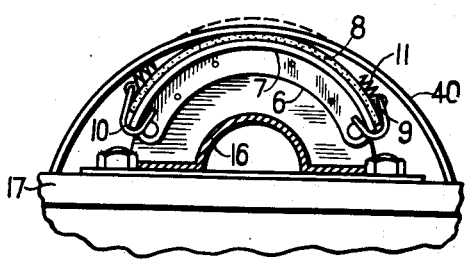
Fig. 4 is a broken, elevational view corresponding to Fig. 1 and showing the flexible straps of the pressure applying element as they first engage the brake liner intermediate the ends of the liner and shoe.
Figure 5:
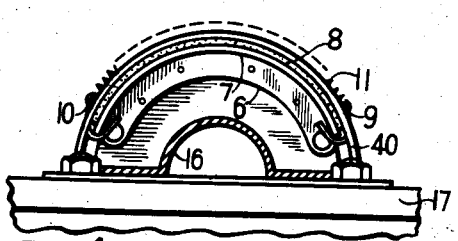

Fig. 5 is a view, similar to Fig. 4, showing the straps fully engaging the liner and indicating how the pulling pressure is applied tangent to the arc of the shoe and liner at the ends of the arc; and Fig. 6 is a broken, top elevational view of the platen with an assembled brake shoe and liner positioned thereon and illustrating the spring and hook retaining means centering the shoe and liner assembly on the platen.

Referring further to the drawings, the machine illustrated is designed to bond liners on standard brake shoes such as presently used on motor vehicles and trucks. One such shoe is indicated at 5 in Figs. 1 and 3 and includes a web portion 6 having a flange or top member 7. The brake liner 8 is bonded to the flange 7 through the use of a bonding agent. The bonding agent in general comprises a thermosetting resin which flows under the application of heat and pressure, or under pressure alone where a cold setting resin is used, to effect the bonding action between the shoe and liner. Any commercial grade of brake liner 8 can be used. The bonding agent is applied to either the shoe or the liner. Furthermore, the bonding agent may be in the form of a strip of impregnated tape, or it may be painted on, or it may be a coating on the liner. The application of heat or pressure or a combination of both heat and pressure causes the bonding agent to react or flow. When the bonding agent sets, the liner is secured to the shoe.

Retaining means for positioning the liner on the brake shoe are provided which enables the operator to assemble the shoe and liner quickly and easily. This retaining means includes a pair of hooks 9 and 10, Fig. 1, connected with a coil spring 11. Each hook, as seen in Fig. 6, is bifurcated in form. The prongs 12 and 13 are spread apart and curved downwardly at the ends so as to engage over the end of the shoe and liner, one prong extending on each side of the web portion 6. When the hooks 9 and 10 are engaged over each end of the shoe, the spring 11 is stretched and presses down upon the liner to hold it in place on the shoe prior to inserting the assembly in the machine.

Figure 1:
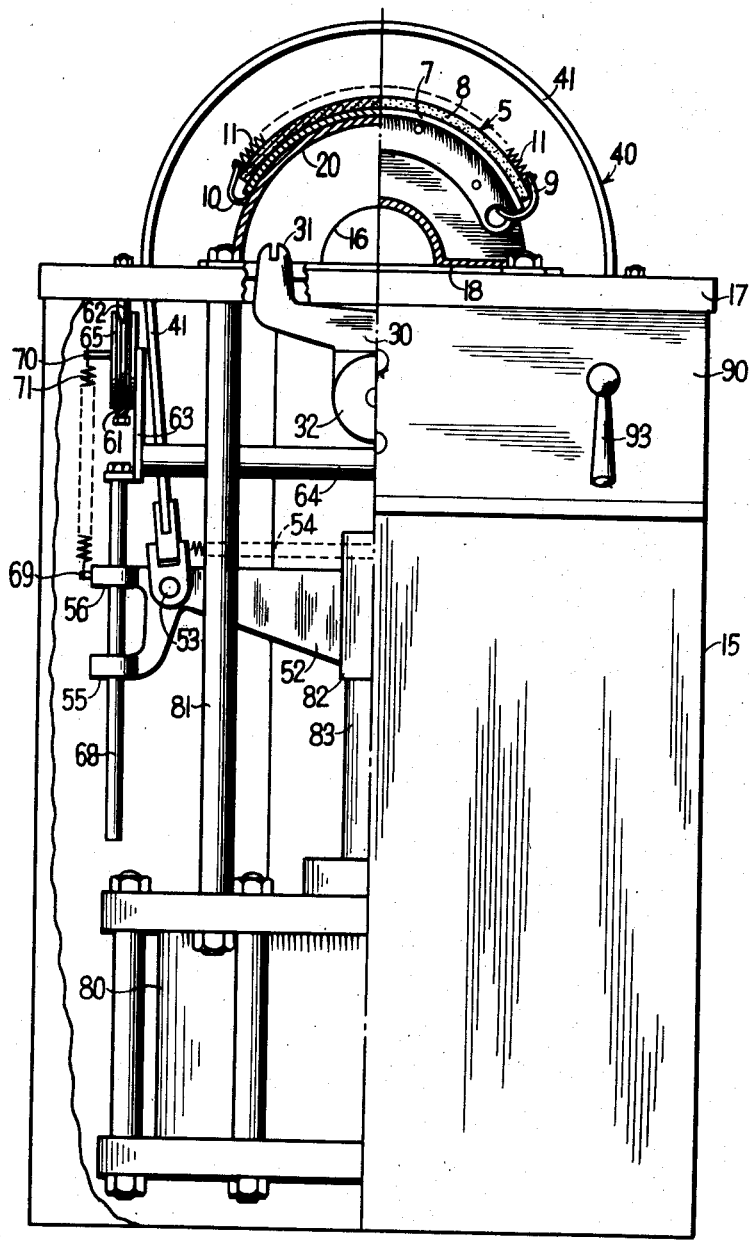
Fig. 1 is a front elevational view of the machine, part of the cabinet being broken away to illustrate the interior construction, and the upper part being shown in vertical section taken on plane I—I of Fig. 2.
Figure 2:
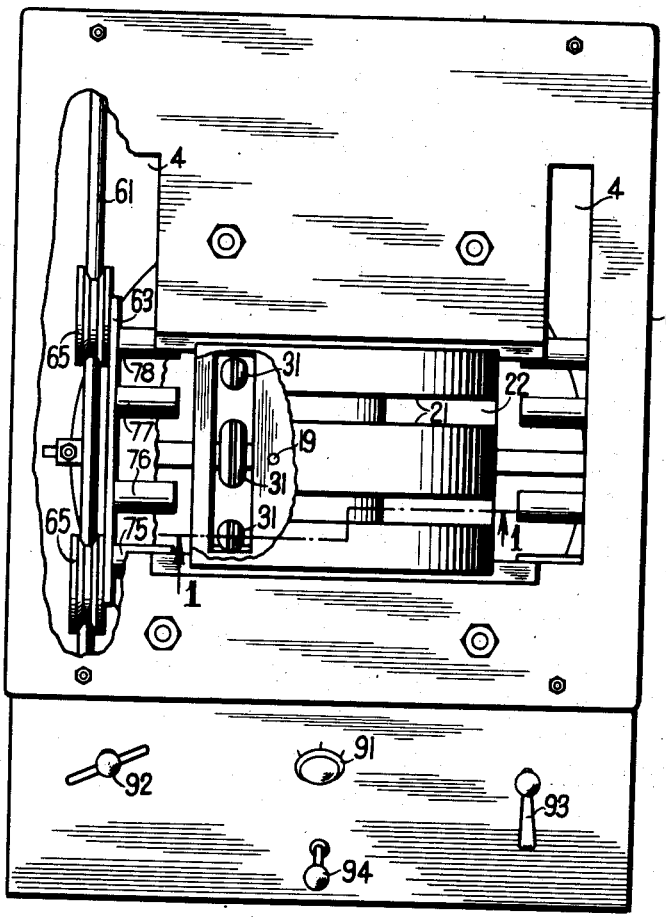
Fig. 2 is a top elevational view of the machine shown in Fig. 1, a portion being broken away to show the carrier and burner construction.
Figure 3:
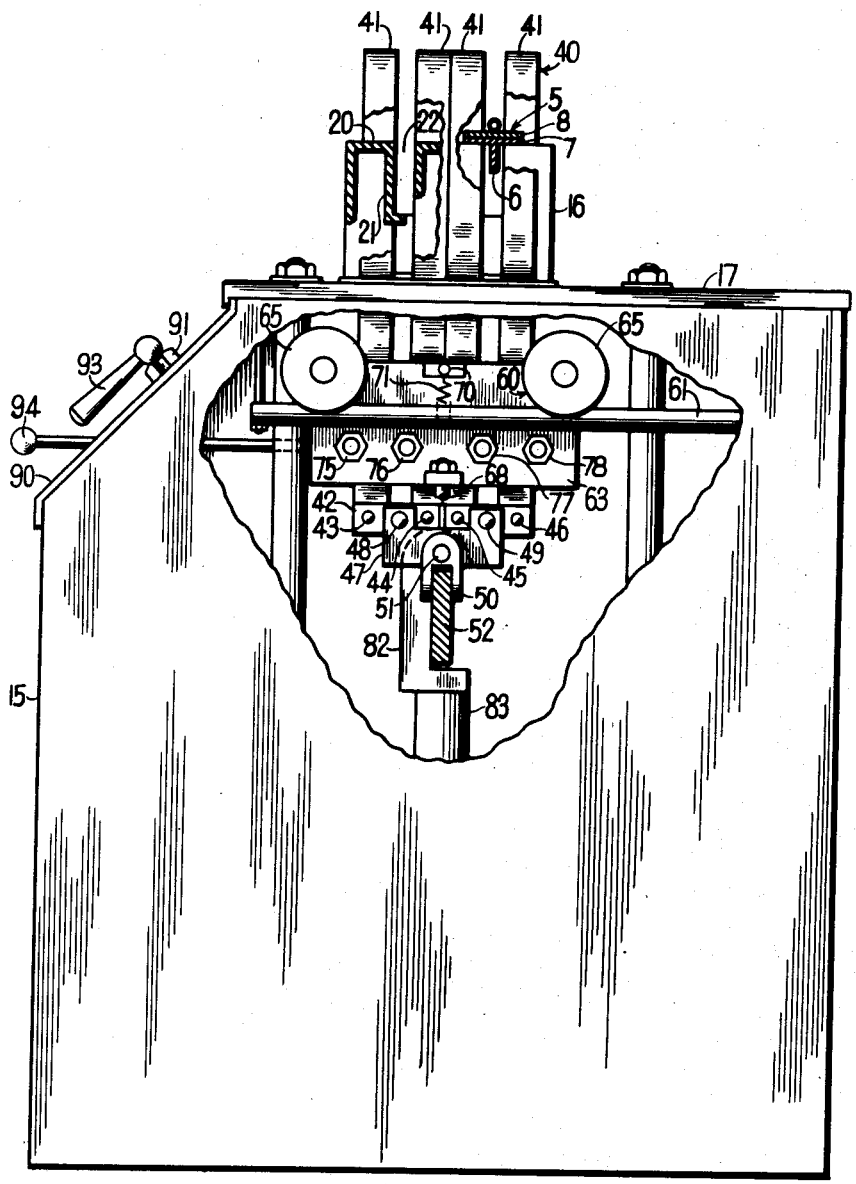
Fig. 3 is a side elevational view of the machine and having a portion of the cabinet broken away to show the mounting construction of the pressure applying element.

In Fig. 1, a cabinet 15 is shown which substantially encloses the machine. The platen or anvil 16 is supported on the top plate 17 of the cabinet as shown. In general, the platen is semi-cylindrical in form having an inner or bottom wall 18 connected to the top plate 17 with dowel pins 19, Fig. 2. The outer or top wall surface 20 of the platen is arcuate in shape, Fig. 1, and indented, as seen in Fig. 2, to form a side wall 21 which provides a plurality of slots or spaced openings as indicated at 22 in Fig. 3. These slots provide web clearance and are of sufficient lengths, width and depth to support the assembled brake shoe and liner as shown in Figs. 1 and 3. The web portion 6 is received within the slot and flange 7 seats on the wall surface 20. The prongs 12 and 13 of the hooks 9 and 10 form locaters for centering the shoe and liner assembly in the slot as indicated in Fig. 6. In the position shown, the prongs 12 and 13 engage the side wall 21 on each side in the slot 22 and thus center the assembly within the slots.

Means for heating the platen are provided as shown in Figs. 1 and 2. In the preferred construction, a gas burner 30 is used. This burner is provided with a number of gas jets 31 which project upwardly through the bottom walls of the platen and supply heat to the wall surface 20 and the side wall 21. Fuel is supplied to the burner from a central manifold 32 connected to a commercial supply of gas in the usual manner. In operation, the fuel pressure and burner flame are adjusted to maintain the temperature of the platen in the range of 500° to 600° F. When the cold brake shoe and liner assembly are placed on the platen, it then requires approximately from 40 to 60 seconds to bring the temperature of the surface between the brake shoe and liner to a bonding temperature of approximately 325° F.

The element for applying pressure between the platen, shoe and liner is indicated generally at 40 and includes a plurality of flat, narrow flexible straps 41. Two longitudinal slots 4, Fig. 2, are formed in the top plate 17 to allow straps 40 to pass through the top of the cabinet 15. These slots are of sufficient length to allow the straps to be moved from a front position to a rear position in a manner later to be described herein. In the construction shown in Fig. 3, two of the straps 41 are provided for each shoe and liner assembly. Each strap is pivotally connected at its ends and held in an arcuate or bowed position as shown in Fig. 1. On each side of the machine the straps 41 have their ends pivotally connected to the plates 42, as indicated at 43, 44, 45 and 46. There are a pair of the plates 42 on each side and the ends of each pair of straps 41 are connected thereto as shown. Each plate 42 in turn is pivotally connected to the ends of the U-shaped bar 47 at the points 48 and 49. The bar 47, which is pivoted and free swinging, forms a singletree for applying a pulling force to plate 42. A clevis 50 is pivotally connected to the mid-point of bar 47 as indicated at 51. The clevis 50 is pivotally connected to the beam 52 as shown at 53 in Fig. 1. A compression spring 54 connected between the clevises provides for forcing the straps 41 outwardly on each side of the machine when the beam 52 is raised. When beam 52 is lowered the straps 41 are pulled downwardly and spring 54 is compressed. The beam 52 is bifurcated at each end and forms tines 55 and 56.

A movable carriage 60 supports the strap element 40 over the platen. A track 61 is provided for the carriage 60. The track is supported at each end from the top plate 17 by the hangers 62. The carriage chassis comprises a pair of plates 63 having a tie rod 64 connected between the plates for support. Rollers 65 connected to the plates support the chassis on the track. Each of the plates 63 is formed with an outwardly projecting flange which supports a guide pin 68. This guide pin extends freely through vertically aligned openings provided in the ends of the tines 55 and 56. As shown in Fig. 1, tine 56 is formed with an outwardly projecting pin 69. A pin 70 projects from the top of plate 63 on each side of the machine. The coil spring 71 is connected between the pins 69 and 70 and provides for holding the straps in the raised position when the beam 52 is disengaged from the pressure applying element 80 and when the carriage is in the back or retracted position. To move the carriage to the retracted position, a lever 94 is fastened to the carriage 60 as seen in Fig. 3. The lever 94 extends from the carriage through front panel 90 and such lever serves as a means to push or pull the carriage 60 whereby the carriage can be moved between retracted and operating positions. Spacing fingers in the form of short rods, indicated at 75, 76, 77 and 78, are bolted in spaced positions along the bottom edge of the plates 63 and project inwardly on each side of the machine. These fingers project between the straps 41 and form guide members when the straps are raised and lowered.

Means for applying a pulling force to the beam 52 can be of any suitable type, such as either a pneumatic or hydraulic cylinder assembly. In the preferred construction shown in Fig. 1, a pneumatic cylinder is indicated at 80 for this purpose. This assembly is supported from the top plate or bolster 17 with studs 81. A hook 82 is connected to the piston rod 83 of the cylinder 80. This hook is adapted to engage freely over the top of the beam 52, as shown in Figs. 1 and 3, and when the piston rod 83 is retracted applies a pulling force to the midpoint of beam 52. When the piston rod is raised and the carriage 60 is moved along the track 61, beam 52 moves from beneath the hook 82. Suitable interlocking mechanism, not shown, may be incorporated in the machine to prevent applying pressure through the cylinder when the carriage is in the back position. Such mechanism can be adapted to prevent moving the carriage to the back position when pressure is being applied.

Controls for operating the machine are located on the front panel 90. These controls include a heat regulator 91, a pressure regulator 92 and gauge, an air control valve 93 for the pneumatic cylinder assembly 80, and an operating lever 94 for shifting the carriage.

The machine is operated as follows:

In the thermosetting process, heat is applied to the platen until its temperature remains in the range of 500–600° F. A brake liner is placed on the brake shoe with the bonding agent between the shoe and the liner. The liner retainer is fastened by engaging the hooks 9 and 10 over the ends of the shoe. Spring 11 is thereby stretched sufficiently to hold the liner in place on the shoe for positioning the assembly on the platen.

With the carriage in the back position, the cold shoe and liner assemblies are then placed in the open slots 22. The prongs 12 and 13 of the liner retainers engage against the side walls 21 of the web clearance slots 22, on each side, and locate the assembly in the center of the slot.

After the shoe and liner assemblies are positioned on the platen, the carriage lever 94 is pulled out by the operator. This movement of lever 94 shifts the carriage to the position in which the straps 41 are in raised position over the platen and beam 52 is under the hook 82. Where, for example, the pressure to be applied to effect the bonding between the lining and shoe is to be maintained at 250 pounds per square inch, the pressure control regulator 92 is set so that cylinder 80 will deliver that pressure. The operator then opens the air control valve 93 which admits air to the cylinder and drives the piston rod 83 down. Hook 82 pulls down on beam 52. This downward pull is transmitted through the clevises 50 to the singletrees 47 and to the equalizer plates 42. Each of the straps 41 is pivotally connected at its ends to the plates 42 and each strap individually adjusts when pulled down into contact with the liner 8. The straps engage first at the outer edge of the liner, then they flatten across the liner, and then progressively around the liner. Downward movement of beam 52 brings the straps into contact with the liner first in a position of line contact at the apex of the arc, i. e. intermediate the ends of the liner and shoe as seen in Fig. 4. The straps 41 engage at the mid-point first since the spring 54 engages between the clevises 50 and hold the ends of the straps spread apart at the sides. Further downward movement of beam 52 causes spring 54 to be compressed and the ends of the straps are pulled inwardly toward the liner as they move downward. Pressure from the straps 41 is thus applied progressively over the surface between the shoe and liner from the point first applied intermediate the ends to the ends. When beam 52 is in its lowest position, the straps 41 engage around the liner as shown in Fig. 5. The downward pulling force of the straps in that position is then applied tangent to the arc of the shoe and liner at the ends of the arc. Also, since the straps are free to adjust individually on the liners, the pressure applied is equally distributed over the entire surface between the shoe and liner.

In operation, while the shoe and liner assembly is held in position on the platen by the applied pressure from the straps, a heat transfer occurs between the preheated platen and the cold shoe and liner assembly. This heat transfer causes the bonding agent to react or flow at which time the pressure, which has been applied continuously and remained constant, continues to be maintained at the same constant pressure and compensates for the flowing of the bonding agent. When the time or pressure cycle has caused the bonding agent to set, the operator then operates the air control valve to raise the piston rod 83. Beam 52 is thereby raised and the pressure being applied by the straps 41 is released. Spring 54 moves the clevises outwardly and spreads the ends of the straps which insures the free upward movement of the straps. The operator completes the operations by shifting the carriage to move the straps away from the platen and removes the shoe and liner assemblies. Where bonding agents are used which are not thermosetting, the cycle of operation is the same as described with the exception that a source of heat is not required.

From the above description it will be apparent that the machine operates to bond the liner on the shoe with a minimum of time and skill being required. The construction and operation of the machine is such that pressure or heat, or a combination of heat and pressure, are directly applied and fully controlled. Due to the relatively short period of time in which the shoe and liner assembly remains in contact with the heated platen, the actual temperature of the liner is never raised to those temperatures used in curing the original liner. Thus, there are no blisters resulting from the operation or break down of the liner characteristics. Furthermore, a maximum pressure is constantly applied to the surface between the shoe and liner, which is maintained equally distributed over this entire surface, and which continues to be so applied and maintained as the bonding agent flows.

While the form of embodiment of the present invention as herein disclosed constitutes a preferred form, it is to be understood that other forms might be adopted, all coming within the scope of the claims which follow:

We claim:

1. A machine for lining a brake shoe, comprising in combination, an arcuately shaped platen element adapted to receive, on its outer periphery, an arcuately shaped brake shoe carrying a liner to be attached to the shoe; mechanism for applying pressure between the liner, shoe and peripheral surface of the platen, including a pair of arcuately arranged flexible strap elements axially spaced from one another and having radii normally longer than the radius of the arc of the platen element, the inner surfaces of the strap elements confronting the outer surface of the platen element, and means for causing relative movement to be imparted between the strap elements and platen element including a single-tree connecting adjacent ends of the strap elements.

2. A machine for lining a brake shoe, comprising in combination, an arcuately shaped platen element adapted to receive, on its outer periphery, an arcuately shaped brake shoe carrying a liner to be attached to the shoe; mechanism for applying pressure between the liner, shoe and peripheral surface of the platen, including a pair of arcuately arranged flexible strap elements axially spaced from one another and having radii normally longer than the radius of the arc of the platen element, the inner surfaces of the strap elements confronting the outer surface of the platen element; a single-tree connecting adjacent ends of the strap elements, and means for moving the strap elements toward the platen element through said single-tree.

3. A machine for lining a brake shoe, comprising in combination, an arcuately shaped platen element adapted to receive, on its outer periphery, an arcuately shaped brake shoe carrying a liner to be attached to the shoe; mechanism for applying pressure between the liner, shoe and peripheral surface of the platen, including a pair of arcuately arranged flexible strap elements axially spaced from one another and having radii normally longer than the radius of the arc of the platen element, the inner surfaces of the strap elements confronting the outer surface of the platen element, a single-tree connecting adjacent ends of the strap elements, a single-tree connecting the other adjacent ends of the strap elements; and means for moving the strap elements toward the platen element through said single-tree.

4. A machine for lining a brake shoe, comprising in combination, a pair of arcuately shaped platen elements axially spaced from one another to receive therebetween the web of a brake shoe and the arcuate surfaces being adapted to receive the edges of the arcuate brake shoe; mechanism for applying pressure between the liner carried by the brake shoe, the brake shoe and peripheral surfaces of the platen elements, including a pair of arcuately arranged flexible strap elements axially spaced from one another and having radii normally longer than the radii of the arc of the platen elements; the inner surfaces of the strap elements confronting the outer surfaces of the platen elements, and means for causing relative movement to be imparted between the strap elements and platen elements including a single-tree connecting adjacent ends of the strap elements.

5. A machine for lining brake shoes, comprising in combination, a plurality of pairs of arcuately shaped platen elements, the elements of a pair each being axially spaced from one another to receive therebetween the web of a brake shoe and the arcuate surfaces being adapted to receive the edges of the arcuate brake shoe; mechanism for applying pressure between the respective liners carried by the brake shoes, and the peripheral surfaces of the platen elements, including a plurality of pairs of arcuately arranged flexible strap elements axially spaced from one another and having radii normally longer than the radii of the arc of the platen elements, the inner surfaces of the strap elements confronting the outer surfaces of the platen elements, and means for causing relative movement to be imparted between the strap elements and platen elements including a single-tree connecting adjacent ends of the strap elements, and a single-tree connecting the pairs of strap elements.

6. A machine for lining brake shoes, comprising in combination, an arcuately shaped platen element adapted to receive, on its outer periphery, an arcuately shaped brake shoe carrying a liner to be attached to the shoe; mechanism for applying pressure between the liner, shoe and peripheral surface of the platen, including a flexible strap element having a normal radius larger than the radius of the arc of the platen, one of said elements having the arcuate portion thereof overlying the arcuate portion of the other and spaced from one another, with the arcuate portion of the flexible strap element having a surface the center of which is adapted to first engage a liner intermediate the ends thereof upon movement of one of said elements toward the other of said elements, with said surface being adapted to progressively engage the liner to the ends thereof upon further movement of one of said elements toward the other of said elements, means for moving one of said elements toward the other for causing pressure to be applied between the liner, shoe and platen; and means for heating the platen.

7. A machine for lining a brake shoe, comprising in combination, a pair of arcuately shaped platen elements axially spaced from one another to receive therebetween the web of a brake shoe and the arcuate surfaces being adapted to receive the edges of the arcuate brake shoe; retaining means for positioning the liner on the shoe including a spring arranged to extend over the circumference of the liner and hooks, said hooks being connected to the ends of the spring, one of said hooks being arranged to hook over one end of the shoe and the other hook being arranged to be hooked over the other end of the shoe, portions of said hooks extending into the space between the platen elements for locating the shoe on the platen elements; a pair of strap elements, each being circumferentially disposed with respect to one of the platen elements and arranged to engage the liner on opposite sides of the spring; and means for causing relative movement to be imparted between the platen and strap elements for causing pressing engagement between the straps and liner.

8. A machine for lining brake shoes, comprising in combination, an arcuately shaped platen element adapted to receive, on its outer periphery, an arcuately shaped brake shoe carrying a liner to be attached to the shoe; mechanism for applying pressure between the liner, shoe and peripheral surface of the platen, including a flexible strap element having a normal radius larger than the radius of the arc of the platen, one of said elements having the arcuate portion thereof overlying the arcuate portion of the other and spaced from one another, with the arcuate portion of the flexible strap element having a surface the center of which is adapted to first engage a liner intermediate the ends thereof upon movement of one of said elements toward the other of said elements, with said surface being adapted to progressively engage the liner to the ends thereof upon further movement of one of said elements toward the other of said elements, means constantly urging the surface away from additional engagement with the liner after the center of the surface has first engaged the liner, means for moving one of said elements toward the other for causing pressure to be applied between the liner, shoe and platen; and means for heating the platen.

H. WILLIAM OVERMAN.
    CHARLES G. WOLGAMOTT.

References Cited in the file of this patent

UNITED STATES PATENTS

| Number | Name | Date |
| --- | --- | --- |
| 1,600,672 | Janowski | Sept. 21, 1926 |
| 1,903,058 | McNaught | Mar. 28, 1933 |
| 2,416,427 | Bonawit | Feb. 25, 1947 |
| 2,434,379 | Wiesner et al. | Jan. 13, 1948 |
| 2,476,588 | Dreher | July 19, 1949 |
| 2,478,405 | Kuzmick | Aug. 9, 1949 |
| 2,494,281 | Batchelor | Jan. 10, 1950 |
| 2,569,737 | Spanich | Oct. 2, 1951 |